United States Patent
Day et al.

(10) Patent No.: US 6,243,722 B1
(45) Date of Patent: Jun. 5, 2001

(54) METHOD AND SYSTEM FOR A NETWORK-BASED DOCUMENT REVIEW TOOL UTILIZING COMMENT CLASSIFICATION

(75) Inventors: Don Rutledge Day, Austin; Carl William Romero, Jonestown, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/976,882

(22) Filed: Nov. 24, 1997

(51) Int. Cl.[7] .............................. G06F 17/21; G06F 17/24

(52) U.S. Cl. ...................... 707/512; 707/530; 707/531

(58) Field of Search .................................. 707/501, 512, 707/513, 530, 531

(56) References Cited

U.S. PATENT DOCUMENTS

| | | | |
|---|---|---|---|
| 5,293,619 | * 3/1994 | Dean ..................................... | 395/650 |
| 5,530,852 | * 6/1996 | Meske, Jr. et al. ................... | 707/512 |
| 5,559,942 | * 9/1996 | Gough et al. ........................ | 395/155 |
| 5,572,643 | * 11/1996 | Judson ................................. | 707/512 |
| 5,671,428 | * 9/1997 | Muranaga et al. ................... | 395/772 |
| 5,787,254 | * 7/1998 | Maddalozzo, Jr. et al. .... | 395/200.58 |
| 5,800,181 | * 9/1998 | Heinlein et al. ...................... | 434/322 |
| 5,826,025 | * 10/1998 | Gramlich ........................ | 395/200.47 |
| 5,870,767 | * 2/1999 | Kraft, IV ............................. | 707/501 |
| 5,872,924 | * 2/1999 | Nakayama et al. ............. | 395/200.35 |
| 5,877,757 | * 3/1999 | Baldwin et al. ...................... | 345/336 |
| 5,884,035 | * 3/1999 | Butman et al. ................. | 395/200.48 |
| 5,937,160 | * 8/1999 | Davis et al. .................... | 395/200.33 |
| 6,009,441 | * 12/1999 | Mathieu et al. ...................... | 707/516 |
| 6,018,748 | * 1/2000 | Smith .................................. | 707/501 |
| 6,029,171 | * 2/2000 | Smiga et al. ......................... | 707/102 |

OTHER PUBLICATIONS

Mark R. Brown Special Edition Using Netscape 2 Second Edition, 1995.*
Warren Ernst Using Netscape, 1995.*
Catlin, T., et al., "InterNote: Extending a Hypermedia Framework to Support Annotative Collaboration", Proceedings of the Second Annual ACM Conference on Hypertext, pp. 365–378, Nov. 1989.*
Fernandez, Judi, Lotus SmartSuite, MIS:Press, pp. 99–100, Dec. 1995.*
Fish, Robert S., et. al., "Quilt: A Collabortive Tool for Cooperating Writing", Proceedings of the Conference Sponsored by ACM SIGOIS and IEEECS TC–OA on Office Information Systems, pp. 30–37, Mar. 1988.*

(List continued on next page.)

Primary Examiner—Heather R. Herndon
Assistant Examiner—William L. Bashore
(74) Attorney, Agent, or Firm—Leslie A. VanLeeuwen; Bracewell & Patterson, L.L.P.

(57) ABSTRACT

A method and system in a computer network for assisting users in collectively creating documents with minimal document intrusiveness via the computer network. Initially, a document is displayed in a graphic interface of a computer in a computer network, such that the document may also be displayed at any one of a number of computers within the computer network. Next, portions of the document are designated which may be commented upon by users. These portions of the document are automatically associated with displayable interface wherein users may enter comments pertaining to the document. The displayable interface is then displayed within the graphic interface, in response to user input. A user is then permitted to enter comments pertaining to the document within the displayable interface, such that the comments may be separately stored, subsequently retrieved and utilized in the creation of the document without cluttering. The displayable interface is then automatically closed upon completion of an entry of comments pertaining to the document within the displayable interface.

21 Claims, 9 Drawing Sheets

OTHER PUBLICATIONS

Lougher, Robert, et. al., "Supporting Long–term Collaboration in Software Maintenance", Proceedings of the Conference on Organizational Computing Systems, Conference on Supporting Group Work, pp. 228–238, Nov. 1993.*

Mashayekhi, Vahid, et. al., "CAIS: Collaborative Asynchronous Inspection of Software", Proceedings of the Second ACM SIGSOFT Symposium on Foundations of Software Engineering, Symposium on Software Development Environments, pp. 21–34, Dec. 1994.*

Microsoft Word User's Guide, Document No. WB57923–0394, Microsoft Corp., pp. 550–556, Dec. 1994.*

Simpson, Alan, Mastering WordPerfect 6 for Windows, Special Edition, Sybex, pp. 101, 129–133, Dec. 1994.*

* cited by examiner

Fig. 5

Distributed Computing Environment for AIX, Version 2.2:—

Quick Beginnings

DCE Web Administration

IBM's DCE/DFS Web Administration is a tool for administering your DCE or DFS environment. It can save your organization time and money through easing administration tasks such as creating users, modifying group membership, setting up filesets, and working with permissions on files or any DCE object.

You can perform these administration actions from any frame-enabled web browser. A Netscape FastTrack 2.01 or Enterprise 2.01 web server must be installed, DFS Web Secure must be installed, and a Netscape server must already be configured.

Application Development Environment

Cover

Prologue

First Edition (December 1997)
Preface

Typographic and Keying
Conventions

Articles

Overview of DCE 2.2 for AIX

METHOD AND SYSTEM FOR A NETWORK-BASED DOCUMENT REVIEW TOOL UTILIZING COMMENT CLASSIFICATION

BACKGROUND OF THE INVENTION

1. Technical Field

The present invention relates to improved information-retrieval methods and systems. In particular, the present invention relates to improved information-retrieval methods and systems utilized in association with graphical user interfaces. Still more particularly, the present invention relates to methods and systems for collectively developing and modifying networked-based documents.

2. Description of the Related Art

The development of computerized information resources, such as remote networks, allows users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television.

In communications, a set of computer networks which are possibly dissimilar from one another are joined together by "gateways" that handle data transfer and the conversion of messages from the sending network to the protocols used by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery.

One type of remote network commonly utilized in recent years is the Internet. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers. The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "web," includes those servers adhering to this standard (i.e., HTTP) which are accessible to clients via a computer or data-processing system network address such as a Universal Resource Locator (URL). The network address can be referred to as a Universal Resource Locator address. For example, communication can be provided over a communications medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to "web pages" constructed from a Hypertext Markup Language (HTML), or other server-generated data. Each web page can also be referred to simply as a "page."

The client and server typically display browsers and other remote network data for a user via a graphical user interface. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., Universal Resource Locator). The Universal Resource Locator address has two basic components, the protocol to be used and the object pathname. For example, the Universal Resource Locator address, "http://www.uspto.gov" (i.e., home page for the U.S. Patent and Trademark Office), specifies a hypertext-transfer protocol ("http") and a pathname of the server ("www.uspto.gov"). The server name is associated with a unique numeric value (TCP/IP address).

The evolution of personal computers over the last decade has accelerated the web and Internet toward useful everyday applications. Nearly every computer sold over the last several years has or will, at some point, become "on-line" to an Internet service provider. Somewhere between 20 and 30 million people around the globe use some form of Internet service on a regular basis. The graphical portion of the World Wide Web itself is usually stocked with more than twenty-two million "pages" of content, with over one million new pages added every month.

Free or relatively inexpensive computer software applications such as Internet "search engines" make it simple to track down sites where an individual can obtain information on a topic of interest. A person may type in a subject or key word and generate a list of network sites (i.e., web sites). Thus, with "home pages" published by thousands of companies, universities, government agencies, museums, and municipalities, the Internet can be an invaluable resource. With a little practice, even new users can skim millions of web pages or thousands of newsgroups, not only for topics of general interest, but also to access precise bits of data. The market for Internet access and related applications is explosive and is growing faster than expected, doubling in size approximately every three months.

Because of the growth of the "Internet" and the so-called "World Wide Web" in recent years, users located in different geographical locations are now positioned to take advantage of this technology to accomplish collaborative, or team writing of documents. However, current tools do not allow for distributed reviews of documents via the web and the Internet. Current methods for team writing are typically time consuming and cumbersome and document intrusive. Commenting on various sections of reviewable documents by various team members leads, under current conditions, to documents cluttered with comments that are often indistinguishable from the document itself. Partial solutions have been attempted which either present a much more intrusive review interface or lack general use with non-HTML formats. Based on the foregoing it can be seen that a need exists for non-intrusive and easy-to-use document review interface that can be utilized by different reviewers at different geographic locations over the World Wide Web or other similar distributed computer networks.

SUMMARY OF THE INVENTION

It is therefore an object of the invention to provide an improved information-retrieval method and system.

It is another object of the invention to provide an improved graphical network navigation aid.

It is still another object of the invention to provide an improved method and system for collectively developing and modifying networked-based documents.

The above and other objects are achieved as is now described. A method and system are provided in a computer network for assisting users in collectively creating documents with minimal document intrusiveness via the computer network. Initially, a document is displayed in a graphic interface of a computer in a computer network, such that the document may also be displayed at any one of a number of computers within the computer network. Next, portions of the document are designated which may be commented upon by users. These portions of the document are automatically associated with displayable interface wherein users may enter comments pertaining to the document. The displayable interface is then displayed within the graphic interface, in response to user input. A user is then permitted to enter comments pertaining to the document within the displayable interface, such that the comments may be separately stored, subsequently retrieved and utilized in the creation of the document without cluttering. The displayable interface is then automatically closed upon completion of an entry of comments pertaining to the document within the displayable interface.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 5 depicts a document displayed within a web browser of a graphical interface in accordance with the method and system of the present invention;

DETAILED DESCRIPTION OF PREFERRED EMBODIMENT

Figure 1:
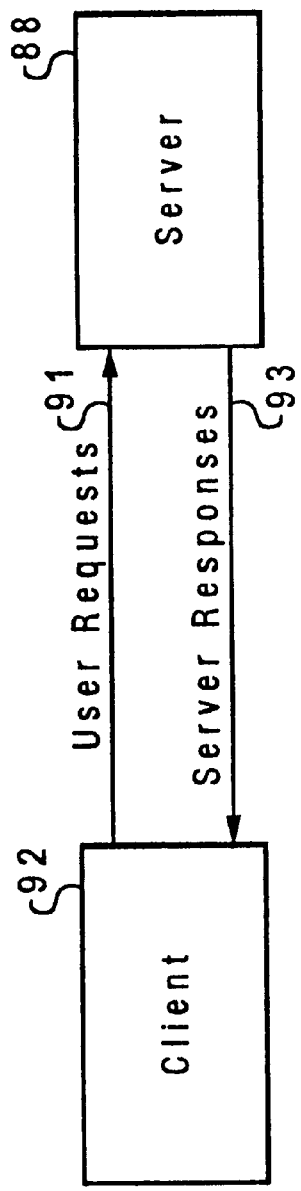
FIG. 1 illustrates a block diagram illustrative of a client/server architecture which can be utilized to implement the method and system of the present invention.

With reference now to the figures and, in particular, with reference to FIG. 1, there is depicted a pictorial representation of a client-server architecture in which the present invention may be implemented in accordance with a preferred embodiment of the present invention. Note that In FIG. 1, FIG. 2, and FIG. 3, like parts are indicated by like numbers. In FIG. 1, user requests 91 for news are sent by a client application program 92 to a server 88. Server 88 can be a remote computer system accessible over a remote network such as the Internet. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system and communicate with the first computer system over a communications medium, thus providing distributed functionality and allowing multiple clients to take advantage of the information-gathering capabilities of the server.

Figure 2:
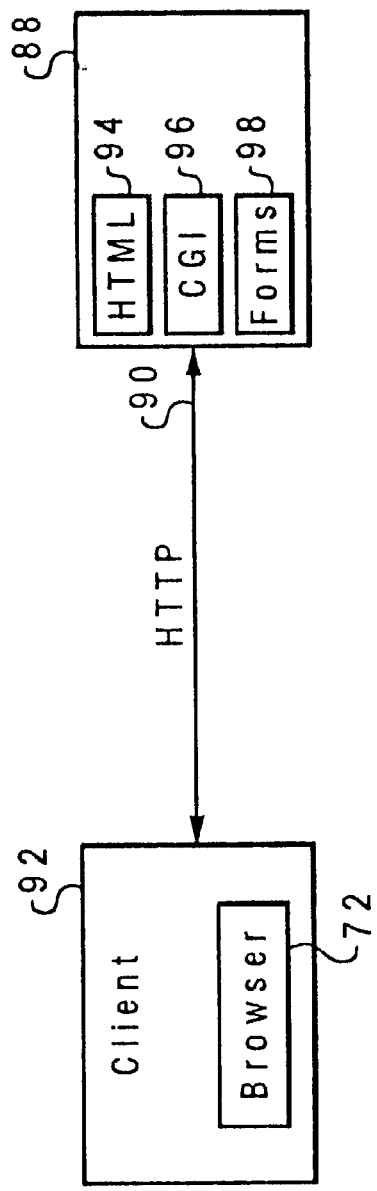
FIG. 2 depicts a detailed block diagram illustrative of a client/server architecture which can be utilized to implement the method and system of the present invention.

FIG. 2 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at run-time (e.g., a workstation), it can be appreciated by one skilled in the art that they may be implemented in a variety of hardware devices, either programmed or dedicated.

Client 92 and server 88 communicate using the functionality provided by HTTP. Active within client 92 is a first process, browser 72, which establishes the connections with server 88, and presents information to the user. Such browsers are often referred to in the art of computer networking as "web browsers." Any number of commercially or publicly available browsers such as Netscape™ may be utilized in accordance with a preferred embodiment of the present invention. A web browser is thus a client application which allows users to view HTML documents on the World Wide Web, another network, or the user's computer.

Server 88 executes the corresponding server software which presents information to the client in the form of HTTP responses 90. The HTTP responses 90 correspond with web "pages," which can be represented by utilizing Hypertext Markup Language (HTML), or other data generated by server 88. For example, under the Mosaic-brand browser, in addition to HTML functionality 94 provided by server 88, a Common Gateway Interlace (CGI) 96 is provided which allows the client program to direct server 88 to commence execution of a specified program contained within server 88. This may include a search engine which scans received information in the server for presentation to the user controlling the client.

Using this interface, and HTTP responses 90, the server may notify the client of the results of that execution upon completion. Common Gateway Interlace (CGI) 96 is one form of a "gateway," a device utilized to connect dissimilar networks (i.e., networks utilizing different communication protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers, such as the Mosaic brand browser described herein. This functionality allows the user via a client application program to specify terms in which the server causes an application program to function (e.g., terms or keywords contained in the types of stories/articles which are of interest to the user).

Figure 3:
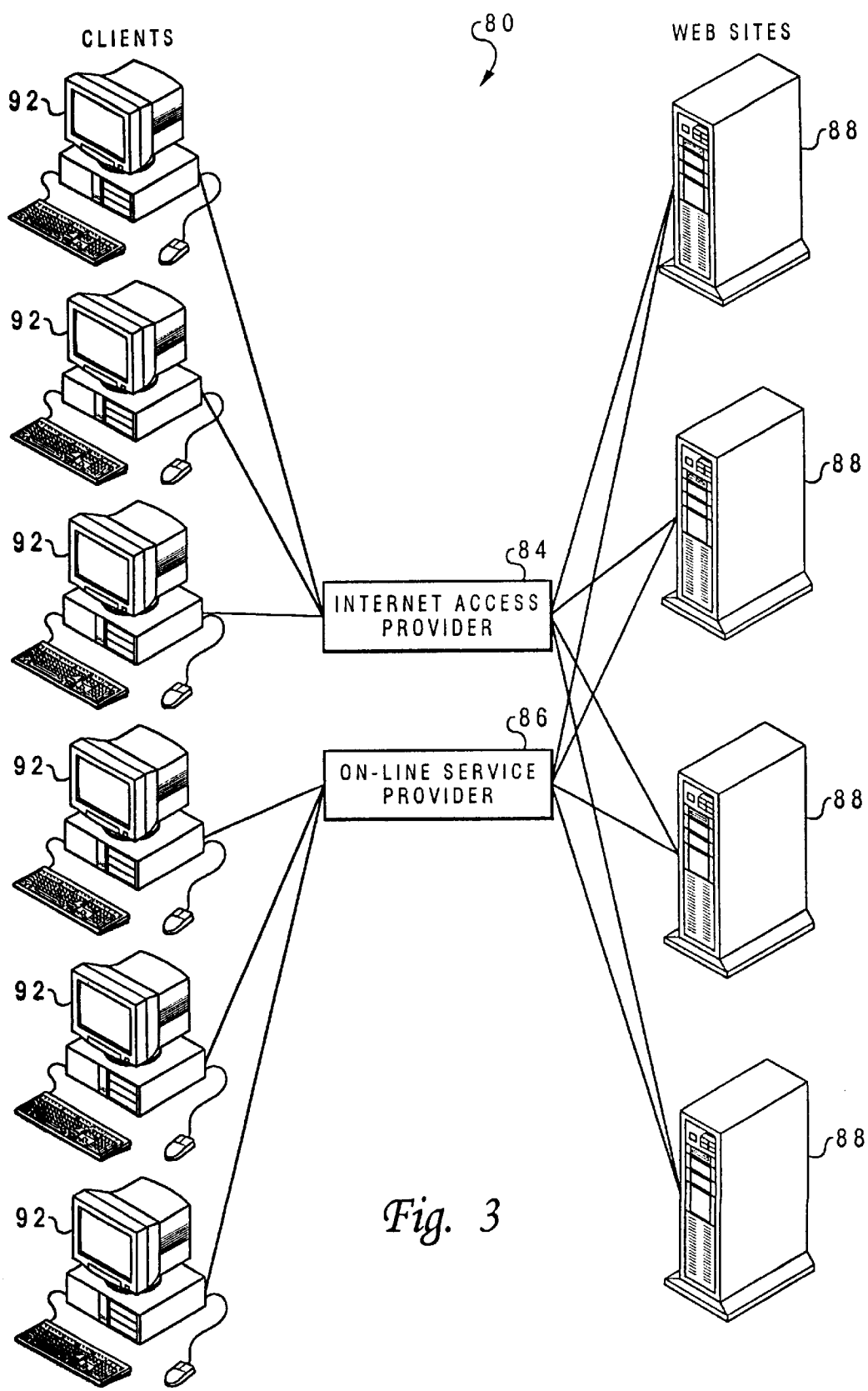
FIG. 3 is a diagram illustrative of a computer network which can be implemented in accordance with the method and system of the present invention.

FIG. 3 is a diagram illustrative of a computer network 80 which can be implemented in accordance with the method and system of the present invention. Computer network 80 is representative of a remote network, specifically the Internet, a known computer network based on the client-server model discussed earlier. Conceptually, the Internet includes a large network of servers 88 which are accessible by clients 92, typically users of personal computers, through some private Internet-access provider 84 (e.g., such as Internet America) or an on-line service provider 86 (e.g., such as America On-Line, Prodigy, Compuserve, and the like). Each of the clients 92 may run a browser, a known software tool utilized to access servers 88 via the access providers 84. Each server 88 operates a web site which supports files in the form of documents and pages. A network path to servers 88 is identified by a Universal Resource Locator having a known syntax for defining a network collection.

Figure 4:
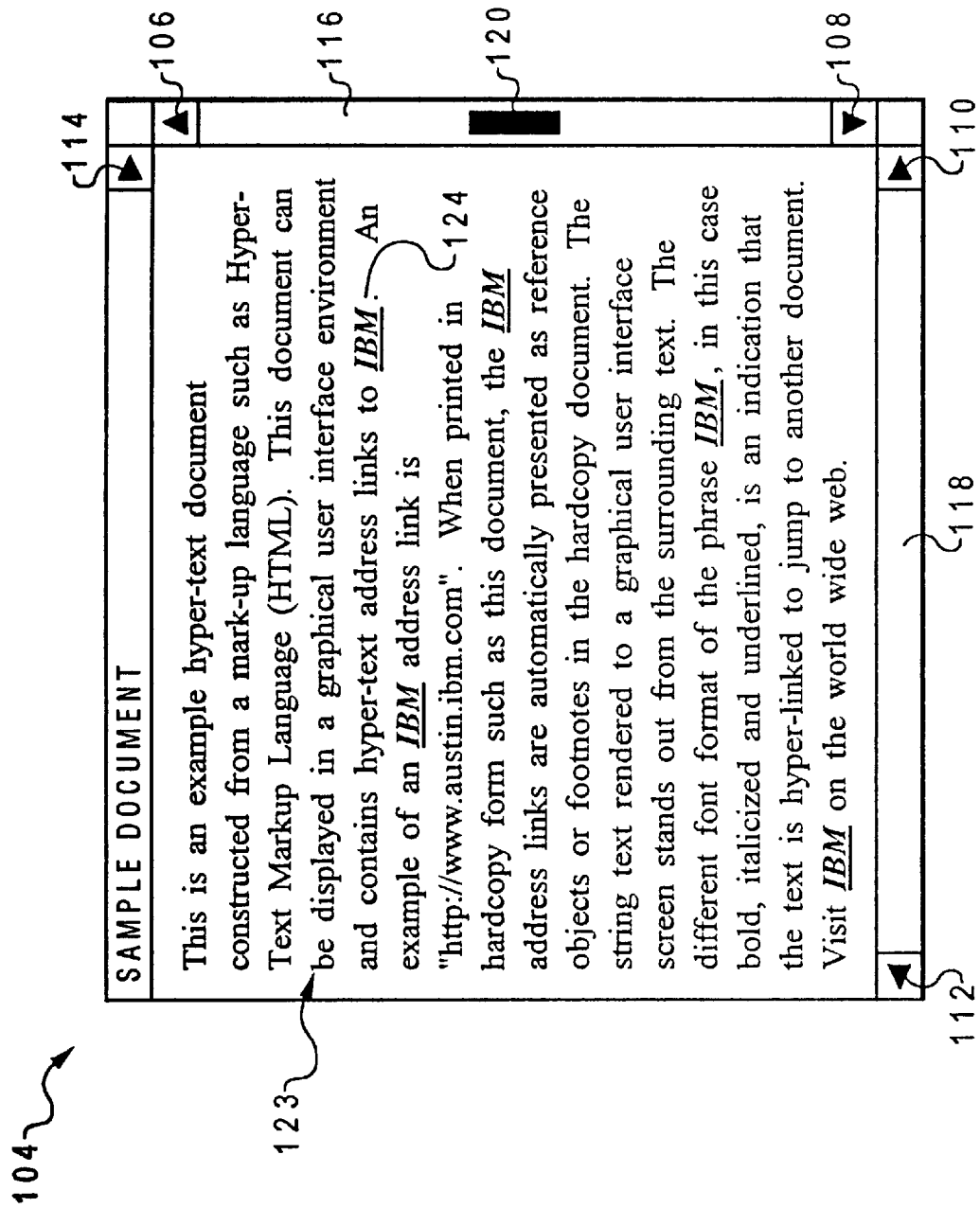
FIG. 4 illustrates a hypertext document contained within a graphical user interface window which can be utilized to implement the method and system of the present invention.

FIG. 4 illustrates an example hypertext document 123 contained within a graphical user interface window 104 which can be utilized in accordance with the method and system of the present invention. Window 104 displays a portion of a hypertext document 123 constructed from a mark-up language, such as Hypertext Mark-up Language (HTML). The size and position of elevator 120 within scroll bar 116 corresponds to the size and position of the current viewable page in relation to hypertext document 123. Hypertext document 123 can be accessed from a data-processing system contained within a remote network, such as the Internet.

In the example of FIG. 4, in view of the fact that hypertext document 123 includes too many pages to view simultaneously, the user can position a mouse cursor over up-arrow section 106 or down-arrow section 108 of scroll bar 116 and click a pointing device (e.g., a mouse) to scroll hypertext document 123 upward or downward, as appropriate. A vertical scroll bar 118 includes arrow section 112 and arrow section 110 for scrolling hypertext document 123 respectively left or right. Also, an optional arrow section 114 allows a user to scroll the document right. Thus, the graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be activated either with a keyboard or a mouse.

Figure 6:
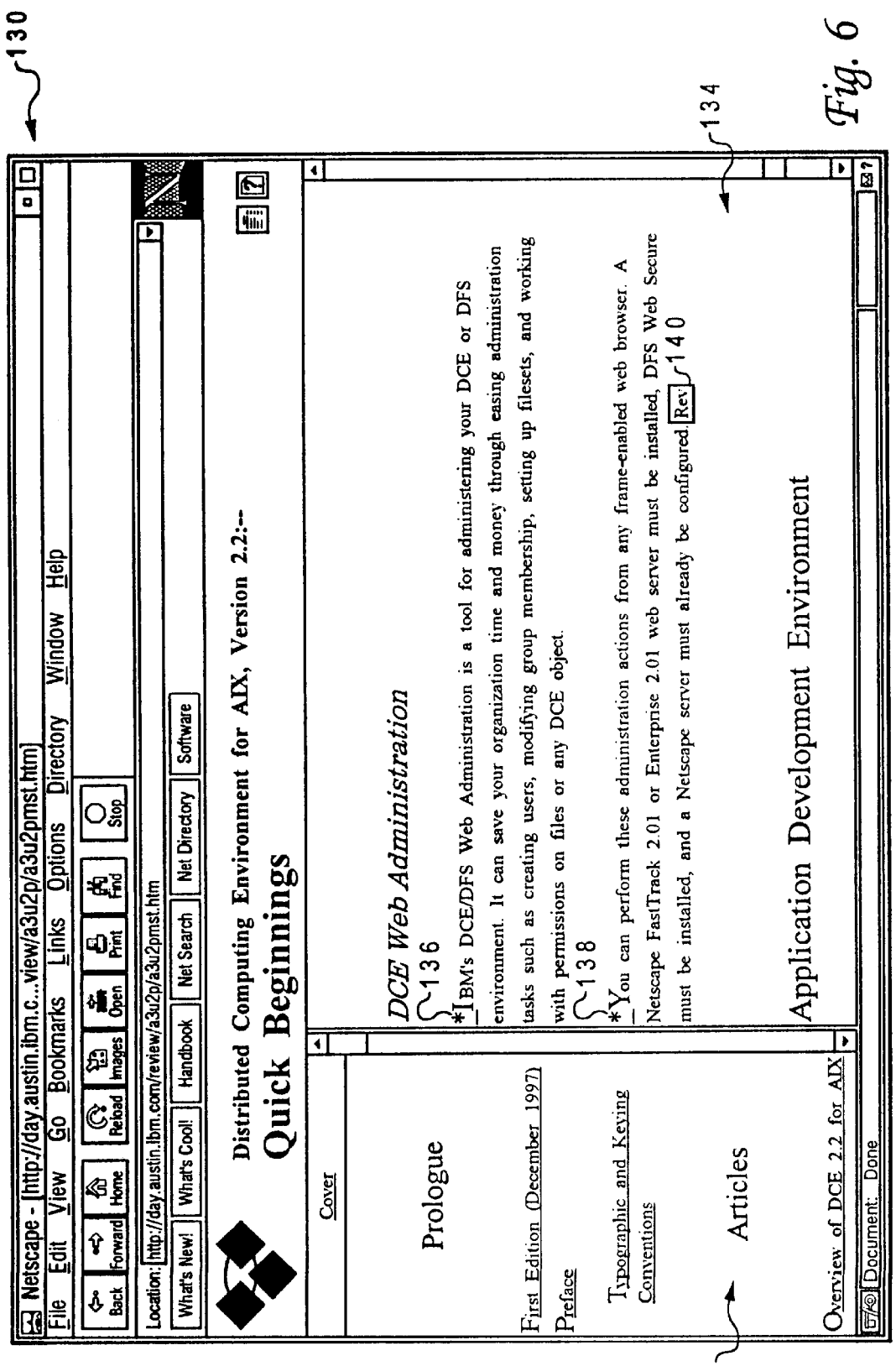
FIG. 6 illustrates a document with associated review buttons displayed within a web browser of a graphical interface in accordance with the method and system of the present invention.

Hypertext document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyper-linked to "jump" to another document. When a user "clicks" on string text 124 with a mouse or other pointing device, the graphical user interface shifts the presently viewed hypertext document 123 to another hyper-linked document.

FIG. 5 depicts a document 134 displayed within a web browser 130 of a graphical user interface window in accordance with the method and system of the present invention. Document 134 is a document which multiple users may desire to collectively write (i.e., team write). However, in standard review practices, team writing is hampered by the fact that members of the writing team may be located in different geographical locations. Thus, reviewing is difficult to accomplish under present conditions. Those skilled in the art will appreciate that browser 134 may be included within a graphical user interface window such as window 104 of FIG. 4. In the example depicted in FIG. 5, document 134 is displayed within a Netscape™ browser. Associated with document 134 is a table of contents 132 to which a user can click on a particular link to move document 134 to a location associated with that link. For example, those skilled in the art will appreciate that "clicking" with a mouse or other pointing device the link titled "typographic and keying conventions" displayed with table of contents 132 will reposition document 134 at a section associated with that particular link. In FIG. 5 to FIG. 8 like parts are indicated by like reference numerals.

FIG. 6 illustrates a document 134 with associated review buttons displayed within a web browser 130 of a graphical interface in accordance with the method and system of the present invention. Document 134 has been modified to include review buttons 136, 138 and 140. Capitalizing on the ubiquity of web browsers within development organizations, the method and system according to the present invention allows for the conversion of existing document source formats into a web-compatible review format. Users who have controlled access may comment on writer-designated locations with the document, comment on other general features, and review comments made by other reviewers. Such a method and system, as elaborated herein, operates via "pop-up" interfaces so that the document is largely free from intrusive review markup and symbols. Server based code manages the logging and redisplay or review comments.

Review buttons 136 and 138 are unsolicited review buttons, which when activated by a user via mouse "click," prompts the display of a pop-up window to which the user may or may not comment. Review buttons 136 and 138 are set by the author or another appropriate user at unsolicited comment points within document 130. Such unsolicited comment points are arbitrary points to which unsolicited review comments may be attached. These are based on source elements, selectable by style. For example, a typical style-based implementation might attach comment points for unsolicited comments to paragraphs, definition list parts, examples, long quotes, list items, and so forth. The points enable response forms to be opened, from which a reader or reviewer may mail a comment or correction to a receiving address. Other implementations of this process may locate these arbitrary points on algorithimically-determined characteristics of discourse, such as at the sentence level, or at topics or significant phrases.

Review button 140 is a solicited review button, which a reviewer is required to review and comment upon at designated review points within document 130. Designated review points are specific points for which specific interaction with reviewers is desired. Such specific points are based on source elements which a writer has identified as being significant. For example, SGML elements altered subsequent to a previous edition might have been flagged with a revision attribute. In conversion to HTML, the scope of the altered portions are highlighted in color and an appropriate review button is added at the beginning or end of such portions. Such review buttons invoke interaction with the review server and its database. Review button 140 is an example of such a review button.

In either case, disruption of the source document by review comments is minimized so that the user interface remains consistent regardless of the number of review comments. Each of these review buttons can be located anywhere within document 130 and associated with a particular element (i.e., word, phrase, text, symbol, etc.) within document 130. The location of such review buttons within document 130 is a choice which can be determined by the author of document 130. Thus, in this manner, the comments are essentially controlled by the author of the document. Sections of document 130 which the document author desires others to comment upon can be made known to others by altering the color or shape of text, phrases, paragraphs or symbols located near or about a particular solicited review button. Associated with document 130 is a scrollable section 144 in which a table of contents for document 130 is displayed.

Figure 7:
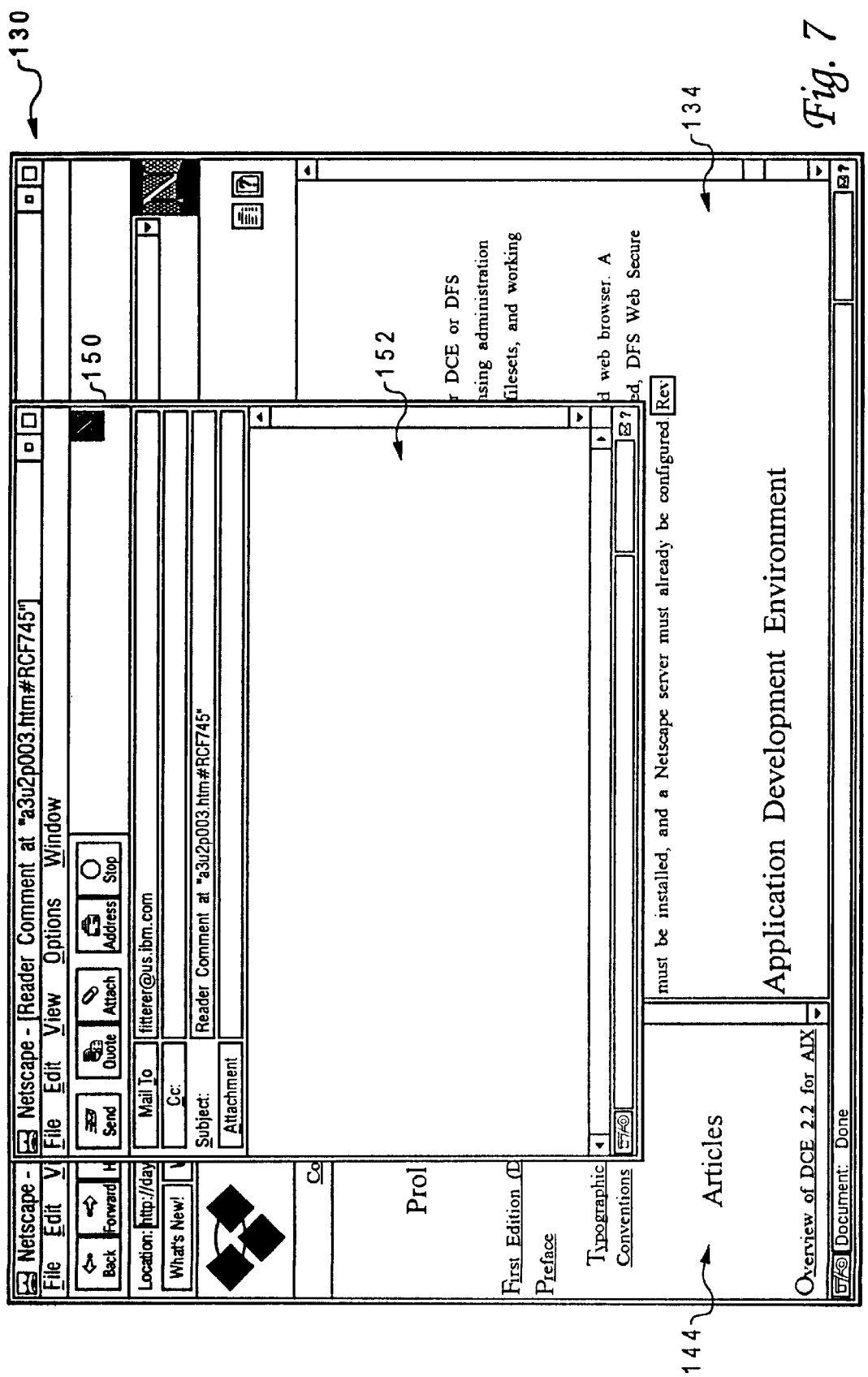
FIG. 7 depicts a mail pop-up interface associated with a review button in accordance with the method and system of the present invention.

FIG. 7 depicts a "pop-up" mail interface 150 associated with a review button in accordance with the method and system of the present invention. When a review button such as review buttons 136, 138 and 140 are "clicked" with a mouse or other pointing device, a pop-up window such as "pop-up" mail interface 150 is displayed for the user. In this particular example, the "pop-up" mail interface allows a user to comment on a particular text or section of document 130 such that these comments can be subsequently sent via a "mail" function to the author or another designated reviewer. Those skilled in the art will appreciate that such "mail" functions are well-known and can be implemented in accordance with a preferred embodiment of the present invention. "Pop-up" mail interference 150 also includes an area 152 in which users can write comments. "Pop-up" mail interface 150 is essentially a window utilized to supplement the interaction in the primary window it is dependent upon (i.e., the window in which browser 130 is displayed).

Figure 8:
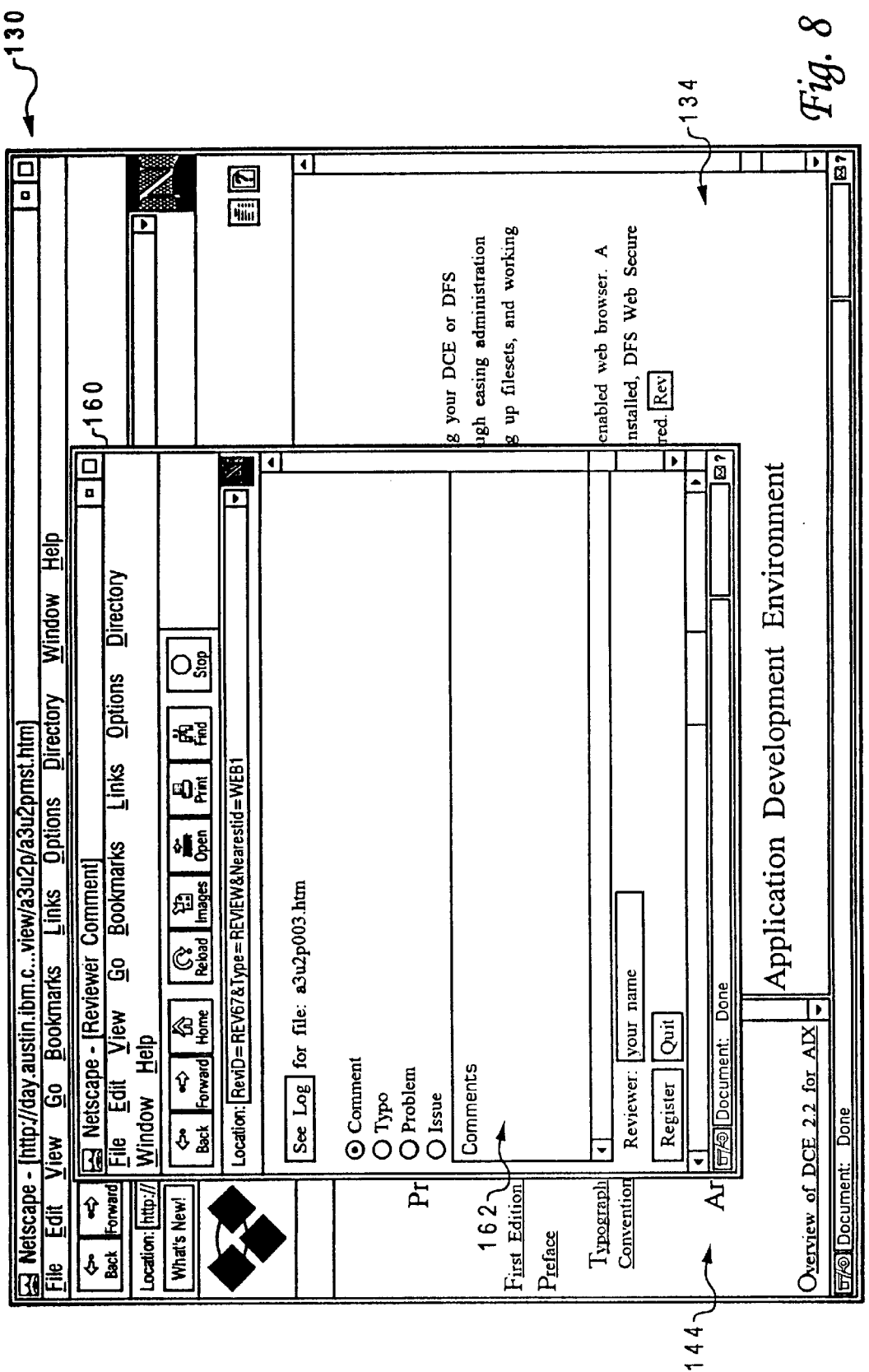
FIG. 8 illustrates a comment pop-up interface associated with a review button in accordance with the method and system of the present invention.

FIG. 8 illustrates a comment "pop-up" interface 160 associated with review buttons in accordance with the method and system of the present invention. When a review button such as review buttons 136, 138 and 140 are "clicked" with a mouse or other pointing device, a pop-up window such as comment "pop-up" interface 160 is displayed for the user. Comment "pop-up" interface 160 allows users to comment on portions of the document designated by the author. In the example depicted in FIG. 8, the comment may be logged and recorded and retrieved subsequently by the author of the document for use in completing the document. When the user completes entry of the comments in comment "pop-up" interface 160, comment "pop-up" interface 160 is closed. The comments are thus entered by the user without altering document 130. These comments can be entered by the user within area 162. Thus, a minimalist document review interface is presented according to the method and system of the present invention. The comments are not part of the reviewed document itself, but are instead associated with the document by appropriate identification links.

Figure 9:
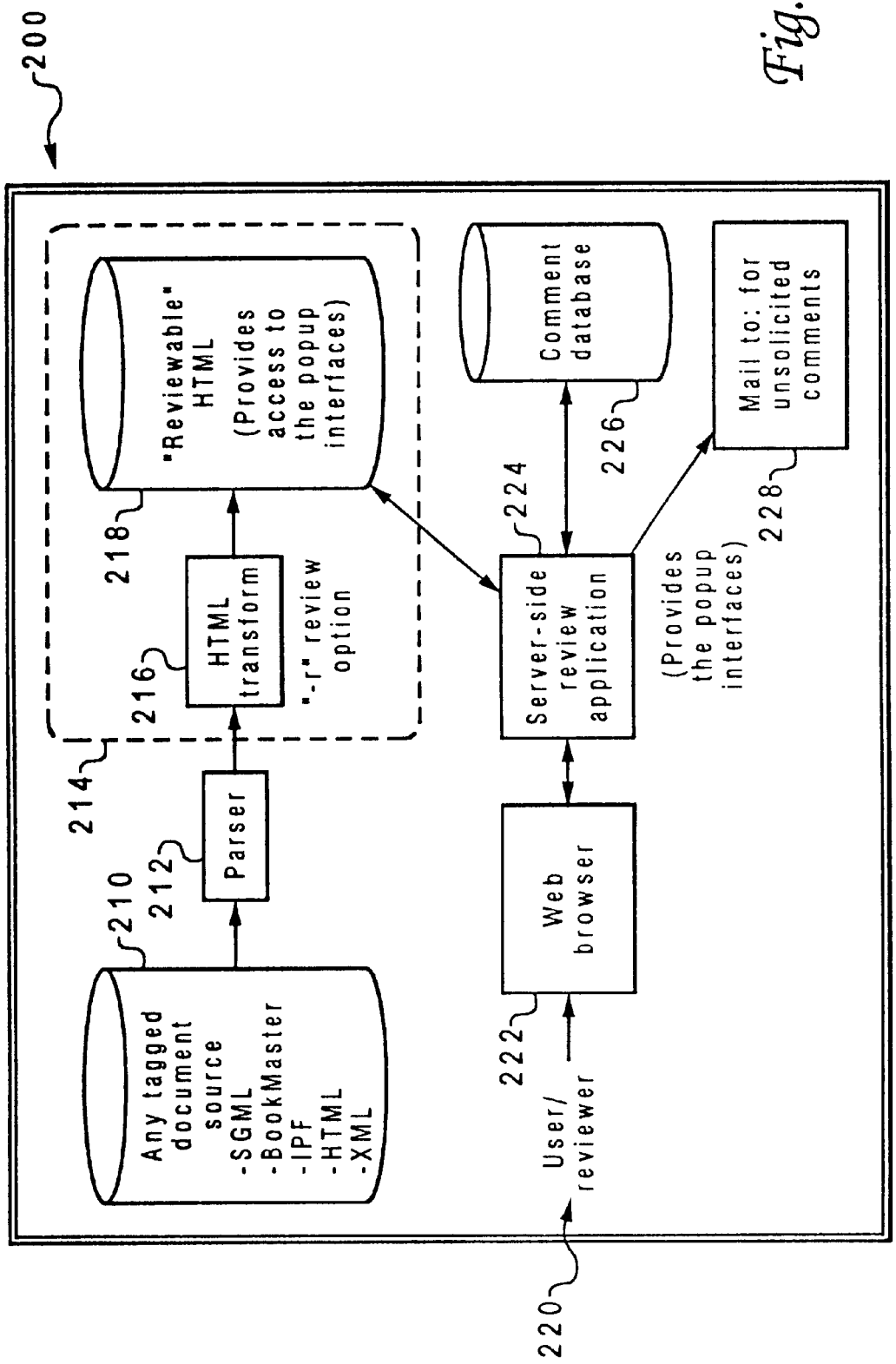
FIG. 9 depicts a block diagram illustrative of a web-based document review tool in accordance with a preferred embodiment of the method and system of the present invention.

FIG. 9 depicts a block diagram 200 illustrative of a web-based document review tool in accordance with a preferred embodiment of the method and system of the present invention. In FIG. 9, a tagged document source 210 is fed to a parser 212. The tagged document source can be based on any tagged document. Those skilled in the art will appreciate that such tagged documents include, but are not limited to, SGML, BookMaster™, IPF, HTML, or XML tagged documents. Parser 212 breaks tagged document source 210 into smaller chunks so that a program can subsequently act upon the information (i.e., tagged document source 210) which was input to parser 212. Dashed lines 214 surround the actual transformation area in which the tagged document source is converted into a reviewable document. Data from parser 212 is input to an HTML transform function 216 which allows the document to have an "-r" review option. Output from HTML transform function 216 results in a reviewable HTML document 218 which provides access to the pop-up interfaces described herein.

A user/reviewer 220 can access web browser 222 which provides two data flow to a server-side review application 224. Server/side review application 224 provides the actual pop-up interfaces, described herein, which allow a user to comment upon a particular portion of the reviewable document. A comment database 226 of solicited comments, as described herein, is provided for the server-side review application 224. A "mail to" function 228 is also provided for the server-side review application 224. Comment database 226 thus provides interaction with comment "pop-up" interface 160 of FIG. 8, and "mail to" function 228 interacts with "pop-up" mail interface 150 of FIG. 7.

Figure 10:
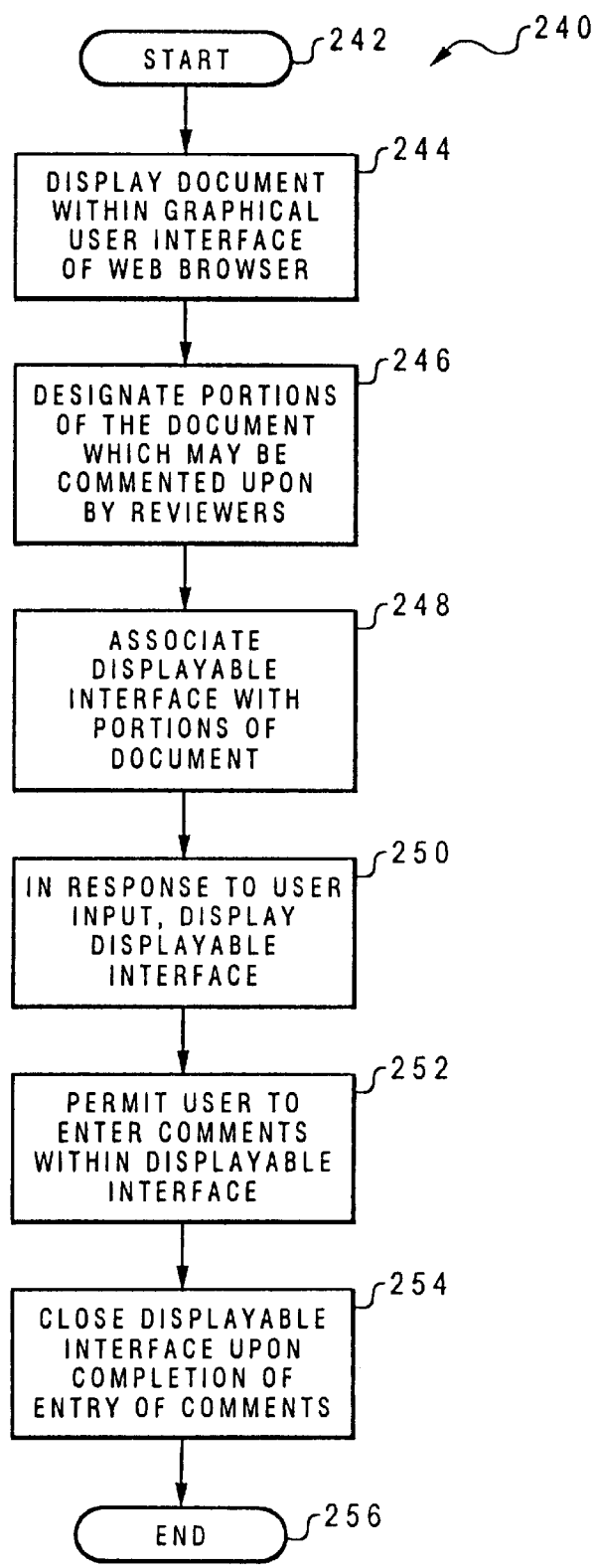
FIG. 10 depicts a flowchart of operations illustrating a method for a web-based document review tool in accordance with a preferred embodiment of the present invention.

FIG. 10 depicts a high-level flowchart of operations 240 illustrating a method for a web-based review tool in accordance with a preferred embodiment of the present invention. It can be appreciated by those skilled in the art that FIG. 10 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

Thus, as depicted at block 242, the process is initiated within a computer network such as the so-called "World Wide Web" for assisting users in collectively creating documents with minimal document intrusiveness via the particular computer network in use. As illustrated at block 244, a document is displayed within a graphical user interface of a web browser application. As depicted at block 246, portions of the document may be designated upon which an author of the document desires other reviewers to comment. These portions of the document can be randomly designated as in the case of unsolicited review buttons as described herein, or can be deliberately designated as in the case of the solicited review buttons described herein. In either case, displayable interfaces are associated with these review buttons, as described at block 248. Examples of such displayable interfaces include comment "pop-up" interface 160 of FIG. 8, and "pop-up" mail interface 150 of FIG. 7. As indicated at block 250, in response to user input, such interfaces are displayed for subsequent user interaction. Once displayed, as described at block 252, a user is permitted to enter comments within the reviewable interface related to the document itself. Such user input can be, for example, a "click" of a particular review button via a mouse or other pointing device. Upon completion of the entry of the comments, the displayable interface is then closed, as illustrated at block 254. Thus the comments entered within the displayable interfaces are not actually part of the document itself but can later be retrieved by the author for utilization in compiling the document. The comments thus do not clutter the document and can be readily accessed by the author.

It is important to note that, while the present invention has been (and will continue to be) described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include: recordable-type media, such as floppy discs, hard-disk drives, audio CDs and CD ROMs, and transmission-type media, such as digital and analog communication links.

While the invention has been particularly shown as described with reference to a preferred embodiment, it will be understood by those skilled in the art that various changes in form and detail may be made therein without departing from the spirit and scope of the invention. Utilization of the Internet in association with the method and system described herein is not a necessary feature of the present invention. For example, the present invention is applicable to other communication networks besides the Internet, including so-called "intranets" (i.e., networks that are internal to particular organizations). The Internet and so-called "World Wide Web", as described herein, are merely one example of a remote network that can be utilized in accordance with a preferred embodiment of the present invention. It is therefore contemplated that such modifications can be made without departing from the spirit or scope of the present invention as defined in the appended claims.

What is claimed is:

1. A method in a collaborative data processing environment for associating user comments with particular portions of a shared document, said method comprising:

receiving at a client a document from a server, wherein said document includes a first portion designated for review, an undesignated second portion, and a selectable object associated only with said first portion;

simultaneously displaying said first portion, said second portion, and said selectable object in a user interface of said client;

in response to a selection of said selectable object, displaying in said user interface a pop-up window that includes an input field for receiving a user comment and that includes two or more objects for specifying a class of said user comment; and in response to a determination that a user has finished entering said user comment in said input field, removing said input field from said user interface and automatically preserving said user comment apart from said document with an identification link associating said user comment only with said first portion.

2. A method according to claim 1, wherein said step of automatically preserving said user comment comprises storing said user comment in a database associated with said document, such that said database associates said comment with said first portion.

3. A method in a collaborative data processing environment for associating user comments with particular portions of a shared document, said method comprising:

receiving at a client a document from a server, wherein said document includes a first portion designated for review, an undesignated second portion, and a selectable object associated only with said first portion;

simultaneously displaying said first portion, said second portion, and said selectable object in a user interface of said client;

in response to a selection of said selectable object, displaying in said user interface an input field for receiving a user comment; and in response to a determination that a user has finished entering said user comment in said input field, removing said input field from said user interface and automatically transmitting said user comment to a designated user with an indication that said user comment is associated with said first portion.

4. A method according to claim 3, wherein said step of simultaneously displaying said first portion, said second portion, and said selectable object comprises displaying said first portion, said second portion, and said selectable object in a web browser, such that said document may also be displayed in, and additional user comments obtained from, one or more additional data processing systems while said document is displayed in, and said user comment is being obtained from, said client.

5. A method according to claim 1, wherein said step of simultaneously displaying said first portion, said second portion, and said selectable object comprises displaying said first portion, said second portion, and said selectable object in a web browser, such that said document may also be displayed in, and additional user comments obtained from, one or more additional data processing systems while said document is displayed in, and said user comment is being obtained from, said client.

6. A method according to claim 3, wherein:

said first portion is designated for solicited review, said selectable object is a first selectable object, said input field is a first input field, and said user comment is a first user comment;

said document includes a third portion designated for unsolicited review and a second selectable object associated only with said third portion; and said method further comprises:

in response to selection of said second selectable object, displaying a second input field in said user interface for receiving a second user comment; and automatically storing said second user comment in a database associated with said document, such that said database associates said second user comment with said third portion.

7. A method according to claim 6, wherein:

said step of displaying said first input field comprises displaying said first input field as a message portion of an e-mail form and including an indication that said first user comment is associated with said first portion in a subject portion of said e-mail form; and said step of displaying said second input field comprises displaying a pop-up window that includes said second input field and that includes two or more objects for specifying a class of said second user comment.

8. A data processing system with facilities for associating user comments with particular portions of a shared document, said data processing system comprising:

an input facility that receives a document from a server, wherein said document includes a first portion designated for review, an undesignated second portion, and a selectable object associated only with said first portion;

a user interface that simultaneously displays said first portion, said second portion, and said selectable object; and a comment acquisition facility that:

displays, in said user interface, a pop-up window that includes an input field for receiving a user comment and that includes two or more objects for specifying a class of said user comment, in response to a selection of said selectable object; and removes said input field from said user interface and automatically preserves said user comment apart from said document with an identification link associating said user comment only with said first portion in response to a determination that a user has finished entering said user comment in said input field.

9. A data processing system according to claim 8, wherein said comment acquisition facility automatically preserves said user comment by storing said user comment in a database associated with said document, such that said database associates said comment with said first portion.

10. A data processing system with facilities for associating user comments with particular portions of a shared document, said data processing system comprising:

an input facility that received a document from a server, wherein said document includes a first portion designated for review, an undesignated second portion, and a selectable object associated only with said first portion;

a user interface that simultaneously displays said first portion, said second portion, and said selectable object; and a comment acquisition facility that:

displays, in said user interface, an input field for receiving a user comment in response to a selection of said selectable object; and removes said input field from said user interface and automatically transmits said user comment to a designated user with an indication that said user comment is associated with said first portion, in response to a determination that a user has finished entering said user comment in said input field.

11. A data processing system according to claim 10, wherein:

said data processing system comprises a first data processing system that includes a web browser; and said user interface displays said first portion, said second portion, and said selectable object in said web browser, such that said document may also be displayed in, and additional user comments obtained from, one or more additional data processing systems while said document is displayed in, and said user comment is being obtained from, said first data processing system.

12. A data processing system according to claim 8, wherein:
   said data processing system comprises a first data processing system that includes a web browser; and
   user interface displays said first portion, said second portion, and said selectable object in said web browser, such that said document may also be displayed in, and additional user comments obtained from, one or more additional data processing systems while said document is displayed in, and said user comment is being obtained from, said first data processing system.

13. A data processing system according to claim 10, wherein:
   said first portion is designated for solicited review, said selectable object is a first selectable object, said input field is a first input field, and said user comment is a first user comment;
   said document includes a third portion designated for unsolicited review and a second selectable object associated only with said third portion;
   said user interface displays a second input field for receiving a second user comment in response to selection of said second selectable object; and
   said comment acquisition facility responds to a determination that a user has finished entering said second user comment in said second input field by automatically storing said second user comment in a database associated with said document, such that said database associates said second user comment with said third portion.

14. A data processing system according to claim 13, wherein:
   said comment acquisition facility displays said first input field as a message portion of an e-mail form and includes an indication that said first user comment is associated with said first portion in a subject field of said e-mail form; and
   said comment acquisition facility displays said second input field in a pop-up window that includes said second input field and that includes two or more objects for specifying a class of said second user comment.

15. A program product for associating user comments with particular portions of a shared document comprising:
   an input facility that receives a document from a server, wherein said document includes a first portion designated for review, an undesignated second portion, and a selectable object associated only with said first portion;
   a user interface that simultaneously displays said first portion, said second portion, and said selectable object;
   a comment acquisition facility that:
      displays, in said user interface, a pop-up window that includes an input field for receiving a user comment and that includes two or more objects for specifying a class of said user comment, in response to a selection of said selectable object; and
      removes said input field from said user interface and automatically preserves said user comment apart from said document with an identification link associating said user comment only with said first portion in response to a determination that a user has finished entering said user comment in said input field; and
   a computer usable medium encoding said input facility, said user interface, and said comment acquisition facility.

16. A program product according to claim 15, wherein said comment acquisition facility automatically preserves said user comment by storing said user comment in a database associated with said document, such that said database associates said comment with said first portion.

17. A program product with facilities for associating a user comments with particular portions of a shared document, said program product comprising:
   an input facility that receives a document from a server, wherein said document includes a first portion designated for review, an undesignated second portion, and a selectable object associated only with said first portion;
   a user interface that simultaneously displays said first portion, said second portion, and said selectable object; and
   a comment acquisition facility that:
      displays, in said user interface, an input field for receiving a user comment in response to a selection of said selectable object; and
      removes said input field from said user interface and automatically transmits said user comment to a designated user with an indication that said user comment is associated with said first portion, in response to a determination that a user has finished entering said user comment in said input field.

18. A program product according to claim 17, wherein:
   said program product comprises a web browser executing on a first data processing system; and
   said user interface displays said first portion, said second portion, and said selectable object in said web browser, such that said document may also be displayed in, and additional user comments obtained from, one or more additional data processing systems while said document is displayed in, and said user comment is being obtained from, said first data processing system.

19. A program product according to claim 15, wherein
   said program product comprises a web browser executing on a first data processing system; and
   user interface displays said first portion, said second portion, and said selectable object in said web browser, such that said document may also be displayed in, and additional user comments obtained from, one or more additional data processing systems while said document is displayed in, and said user comment is being obtained from, said first data processing system.

20. A program product according to claim 17, wherein:
   said first portion is designated for solicited review, said selectable object is a first selectable object, said input field is a first input field, and said user comment is a first user comment;
   said document includes a third portion designated for unsolicited review and a second selectable object associated only with said third portion;
   said user interface displays a second input field for receiving a second user comment in response to selection of said second selectable object; and
   said comment acquisition facility responds to a determination that a user has finished entering said second user comment in said second input field by automatically storing said second user comment in a database associated with said document, such that said database associates said second user comment with said third portion.

21. A program product according to claim 20, wherein:

said comment acquisition facility displays said first input field as a message portion of an e-mail form and includes an indication that said first user comment is associated with said first portion in a subject field of said e-mail form; and said comment acquisition facility displays said second input field in a pop-up window that includes said second input field and that includes two or more objects for specifying a class of said second user comment.

* * * * *